US007204793B2

(12) United States Patent
Hedin

(10) Patent No.: US 7,204,793 B2
(45) Date of Patent: Apr. 17, 2007

(54) DEVICE FOR MOVING DIE TOOLS AND MOULDS IN A PRESS

(75) Inventor: Kenneth Hedin, Lagan (SE)

(73) Assignee: Hedin Lagan AB, Lagan (SE)

( * ) Notice: Subject to any disclaimer, the term of this patent is extended or adjusted under 35 U.S.C. 154(b) by 0 days.

(21) Appl. No.: 11/376,153

(22) Filed: Mar. 16, 2006

(65) Prior Publication Data

US 2006/0223687 A1 Oct. 5, 2006

Related U.S. Application Data

(60) Provisional application No. 60/662,358, filed on Mar. 17, 2005.

(30) Foreign Application Priority Data

Mar. 17, 2005 (EP) ................................ 05005841

(51) Int. Cl.
*B23Q 3/155* (2006.01)

(52) U.S. Cl. ........................ 483/28; 100/224; 100/918; 72/448

(58) Field of Classification Search ............ 483/28–29; 100/214, 224, 918, 269.04, 269.02, 229 R; 72/448; 83/954, 552, 629, 697
See application file for complete search history.

(56) References Cited

U.S. PATENT DOCUMENTS 3,139,676 A 7/1964 Grover
3,841,141 A * 10/1974 Rachwal ..................... 483/28
4,090,287 A 5/1978 Selander
4,498,384 A * 2/1985 Murphy ..................... 100/224

(Continued)

FOREIGN PATENT DOCUMENTS

DE 44 37 085 A1 4/1996

(Continued)

OTHER PUBLICATIONS

Wardcraft "Quick Die Change: The Economical Solution To Your Die Change Needs," Bulletin DC500, Spring Arbor, Michigan, 8 page brochure.

(Continued)

*Primary Examiner*—Erica Cadugan
(74) *Attorney, Agent, or Firm*—Birch, Stewart, Kolasch & Birch, LLP

(57) ABSTRACT

A device for moving objects (4), such as die tools or molds, to and from the table (2) of a press (1) comprises a bar (24) being vertically movable, by means of inflating a bag (10), from a first position in which an upper surface (26) of the bar (24) is located below the upper surface (16) of the table (2) to a second position in which the upper surface (26) of the bar (24) is located above the upper surface (16) of the table (2). The bar (24) is adapted to slide horizontally in its longitudinal direction and is provided with gear teeth (28). A gear wheel (32), engaging the gear teeth (28) of the bar (24), is adapted to move the bar (24) in the horizontal direction along the slot (14) when the bar (24) is in its second position and thus to move an object (4) resting on the upper surface (26) of the bar (24).

11 Claims, 10 Drawing Sheets

U.S. PATENT DOCUMENTS

| | | | | | |
|---|---|---|---|---|---|
| 4,691,554 | A | | 9/1987 | Murphy | |
| 4,700,624 | A | * | 10/1987 | Murphy | 100/224 |
| 4,819,554 | A | * | 4/1989 | Fleischer et al. | 100/224 |
| 5,040,404 | A | * | 8/1991 | Henderson et al. | 100/918 |
| 5,129,254 | A | * | 7/1992 | Keizer et al. | 72/448 |
| 5,146,774 | A | * | 9/1992 | Smith | 72/446 |
| 5,277,687 | A | * | 1/1994 | Shimoichi et al. | 483/28 |
| 5,466,207 | A | | 11/1995 | Arens | |
| 5,582,062 | A | * | 12/1996 | Sommer | 72/448 |
| 5,619,913 | A | * | 4/1997 | Padovani | 483/28 |
| 5,947,676 | A | | 9/1999 | Richard | |
| 6,478,722 | B1 | * | 11/2002 | Graham et al. | 483/28 |

FOREIGN PATENT DOCUMENTS

| | | |
|---|---|---|
| GB | 2 133 377 | 7/1984 |
| NL | 267880 | 6/1964 |

OTHER PUBLICATIONS

"Die Roll: The fact and effective die change system," 2 page brochure.

* cited by examiner

IIIc

IVc

DEVICE FOR MOVING DIE TOOLS AND MOULDS IN A PRESS

This Nonprovisional application claims priority under 35 U.S.C. § 119(e) on U.S. Provisional Application No(s). 60/662,358 filed on Mar. 17, 2005, 35 U.S.C. § 119(a) on Patent Application No(s). 05005841.1 filed in the European Patent Office on Mar. 17, 2005, the entire contents of which are hereby incorporated by reference.

FIELD OF THE INVENTION

The present invention relates to a device for moving objects to and from the table of a press, said device comprising a bag located at the bottom of an elongated slot formed in an upper surface of the table, a strip located in the slot on top of the bag, and an elongated bar which is located in the slot on top of the strip, the bar being vertically movable, by means of inflating the bag, from a first position in which an upper surface of the bar is located below the upper surface of the table to a second position in which the upper surface of the bar is located above the upper surface of the table so as to lift an object located on the table, the bar being adapted to slide horizontally in its longitudinal direction on top of the strip.

BACKGROUND OF THE INVENTION

In presses die tools and moulds need to be moved in and out of a press table on a regular basis. U.S. Pat. No. 4,691,554 describes a die transfer system which is based on vertically movable rails provided with rollers. Each movable rail is provided in an inverted T-slot and comprises an air bag which can be inflated in order to elevate the rollers vertically to a position above the upper surface of the table. Thus it is possible to grip the die tool or mould and, with the application of a force, roll it out of the press, or vice versa. A problem with the die transfer system of U.S. Pat. No. 4,691,554 is, however, that manual force or a special gripping device is required to move the die.

A known solution to this problem is to provide, in each of the inverted T-slots of a table, a bar which slides on a strip of metal provided on top of an air bag located at the bottom of the inverted T-slot. The bar is, at one end, connected to a hydraulic cylinder adapted to force the bar in a horizontal direction. In order to move a die tool from the table the air bag is first inflated. When inflated the air bag lifts the strip, and thus the bar, vertically upwards to lift the die tool or mould a short distance from the surface of the table. The hydraulic cylinder then acts on the end of the bar to drag the bar, and the mould or die tool resting thereon, horizontally out of the press, the bar sliding on the strip.

A problem with this bar solution is, however, that it takes up considerable space in the area of the press and increases the demand for floor area required for each press.

SUMMARY OF THE INVENTION

An object of the present invention is to provide a system for moving die tools or moulds in a press, which system requires less floor area than the prior art transfer systems.

This object is achieved by a device according to the preamble and characterized in the bar being provided with gear teeth, the device further comprising a gear wheel engaging the gear teeth of the bar, a motor being adapted to rotate the gear wheel to move the bar in the horizontal direction along the slot when the bar is in its second position and thus to horizontally move objects resting on the upper surface of the bar.

An advantage with this device is that it can be made very compact since the gear wheel is located next to the bar. In addition to saving floor area the system is also well adapted for applications where the object is to be moved a considerable distance since the distance the bar can be moved is not limited by a piston of a hydraulic cylinder or similar device. The system is robust and well suited to fit the tough environment associated with presses.

According to a preferred embodiment the strip is located below shoulders formed in the slot. The shoulders have the advantage of limiting the movement of the strip in the vertical direction. Thus, in the second position of the bar, the upper surface of the bar will have a well-defined height above the upper surface of the table.

Preferably said slot is an inverted T-slot. An inverted T-slot is a standard machine element often used in tables for presses. The device of the present invention can thus be easily fitted into a standard table for a press. Further the inverted T-slot has a lower portion suitable for housing the bag and the strip and preventing them from moving, in a vertical direction, out of their positions.

Preferably the gear wheel is covered by a housing. The housing, which preferably opens only in the direct of the bar, protects the gear wheel from damage caused by the objects on the table of the press. Further, operators working close to the machine are also protected from injuries caused by the gear wheel.

Preferably the gear wheel and a vertical shaft, by which the motor is able to rotate the gear wheel, are mounted adjacent to a lateral side of the press table. An advantage of this is that it provides a particularly compact design.

According to a preferred embodiment the bar is provided with the gear teeth on at least one lateral side, the gear wheel being adapted to rotate in a substantially horizontal plane. An advantage of this embodiment is that the gear teeth are not located at the upper surface and not in direct contact with the strip. The provision of the gear teeth on a lateral side provides for minimum wear and friction related to the gear teeth.

Preferably said bag is inflated by means of pressurized air. Inflating with pressurized air provides for a simple control of the force with which the bar lifts the object located on the table.

According to a preferred embodiment the device further comprises at least one rail unit, the rail unit comprising a rail being vertically movable in a rail slot in the upper surface of the table, said rail slot being parallel with and adjacent to said slot housing said bar, the rail unit further comprising a rail bag located at the bottom of the rail slot, and a number of rollers supported by the rail, the rail being vertically movable, by means of inflating the rail bag, from a first position, in which the rollers are located below the upper surface of the table, to a second position, in which the rollers extend above the upper surface of the table to lift objects located on the table, the rail being adapted to be moved to its second position at the same time as the bar is moved to its second position in order to decrease the pressure of the objects on said bar and to decrease the friction between said bar and said strip. The rail unit provides for assisting the bar in lifting the object/-s from the upper surface of the press table. Thus the friction between the strip and the bar is decreased, which lowers the power needed to move the object/-s.

A further object of the present invention is to provide a table for a press, which table enables easy moving of die tools and moulds without requiring a lot of floor space.

This object is achieved by a table comprising at least two elongated slots having inverted T-slot shape and being formed in an upper surface of the table, the table comprising at least one device of the above described type for moving die tools and moulds in and out of the press.

These and other aspects of the invention will be apparent from and elucidated with reference to the embodiments described hereinafter.

BRIEF DESCRIPTION OF THE DRAWINGS

The invention will now be described in more detail with reference to the appended drawings in which.

DESCRIPTION OF PREFERRED EMBODIMENTS

Figure 1A:
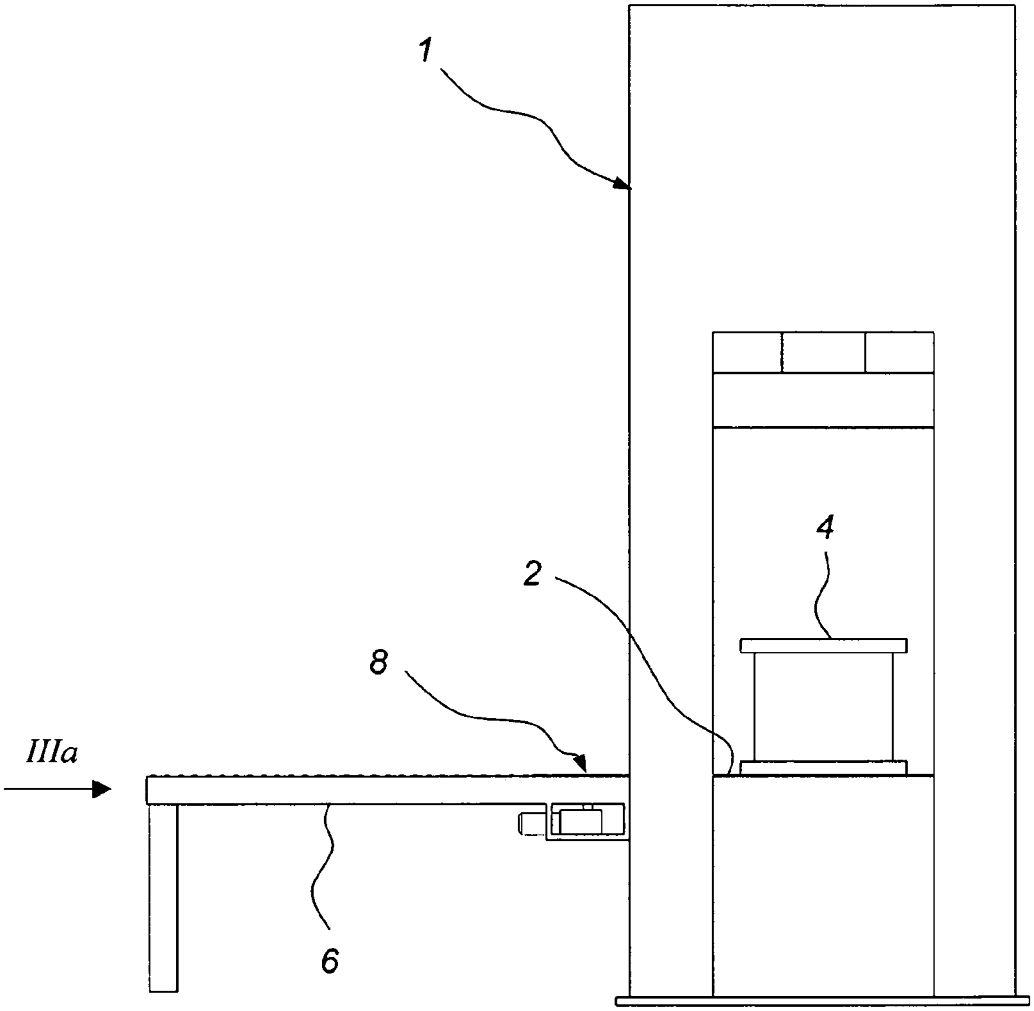
FIG. 1*a* is a side view and shows a press provided with a press table and a tool transfer table.
Figure 1B:
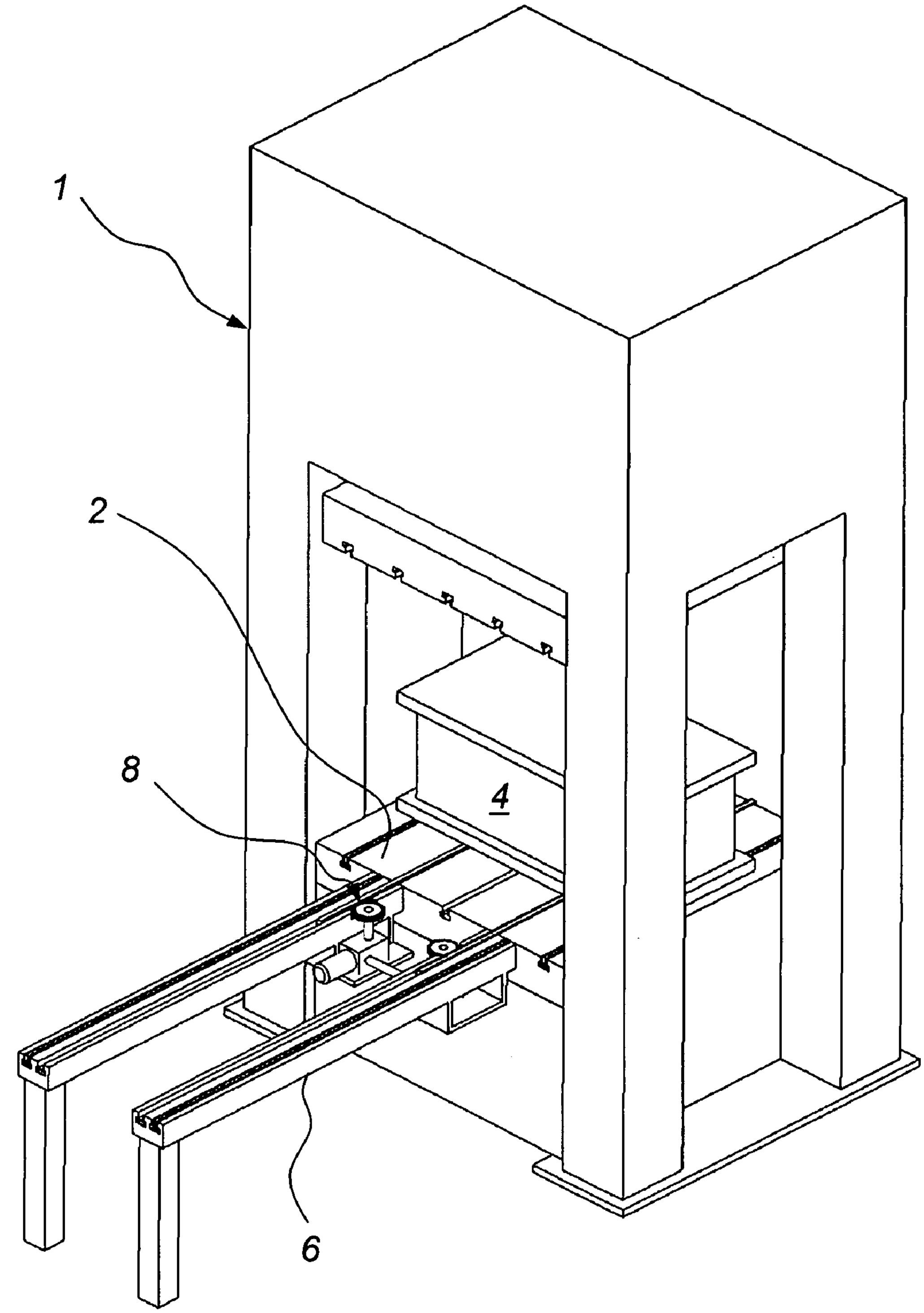
FIG. 1*b* is a three-dimensional view and shows the press table of FIG. 1*a*.

FIGS. 1*a* and 1*b* show a press 1. The press comprises a press table 2, which may also be called a bolster, which is located at the lower part of the press 1. On the press table 2 a heavy object 4 is located. The object 4 is typically a die tool or a mould on which the press 1 has just performed a pressing operation. Due to the weight of the object 4, typically 300–10 000 kg it is not easily moved away from the press 1. Adjacent to the press 1 a side table 6 is located. The side table 6 is an example of an intermediate storage place for objects like die tools and moulds. The press is provided with a device 8 for moving the object 4.

Figure 2A:
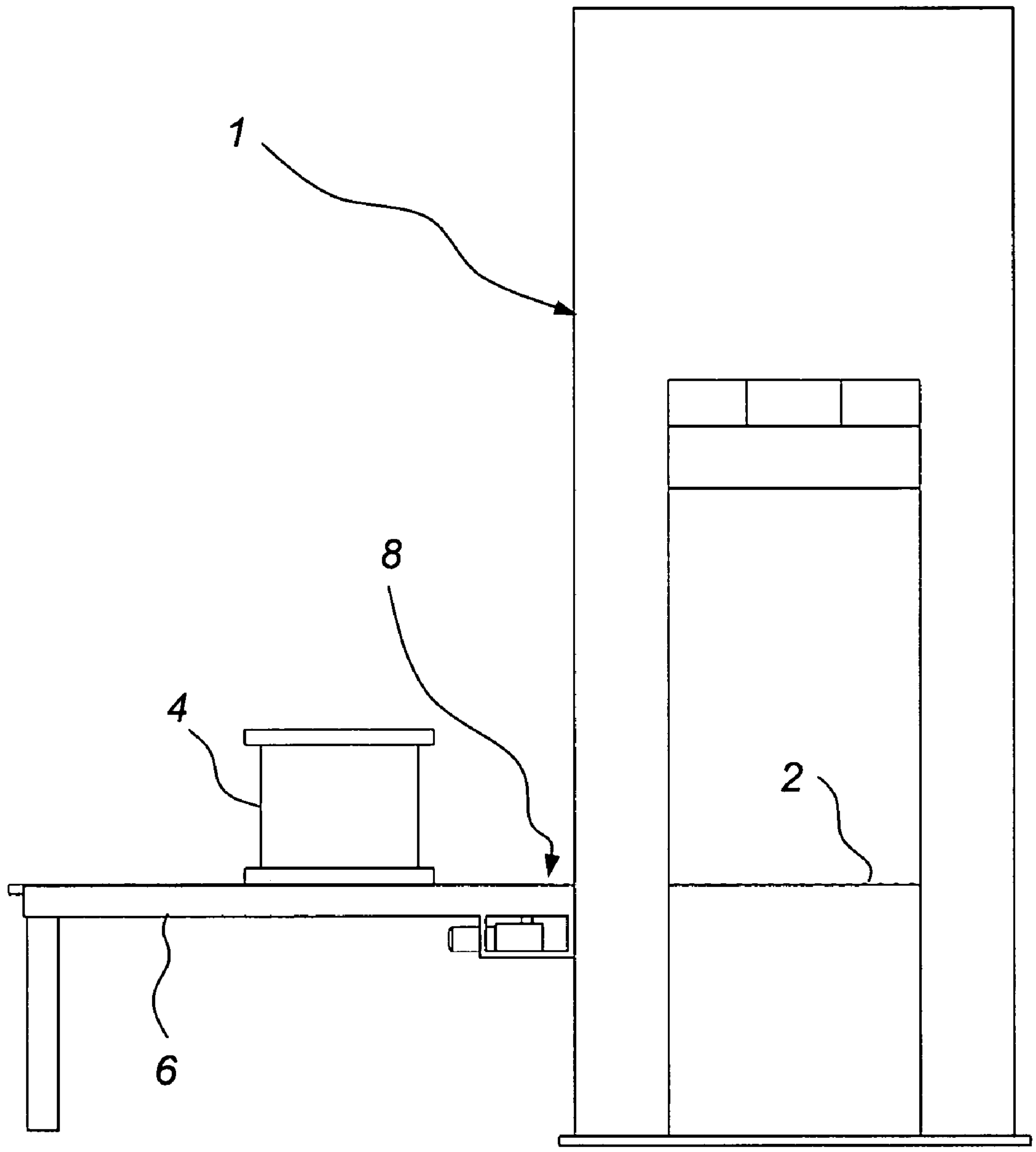
FIG. 2*a* is a side view and shows the press table of FIG. 1*a* after an object has been moved away from the press table by means of the device of the present invention.
Figure 2B:
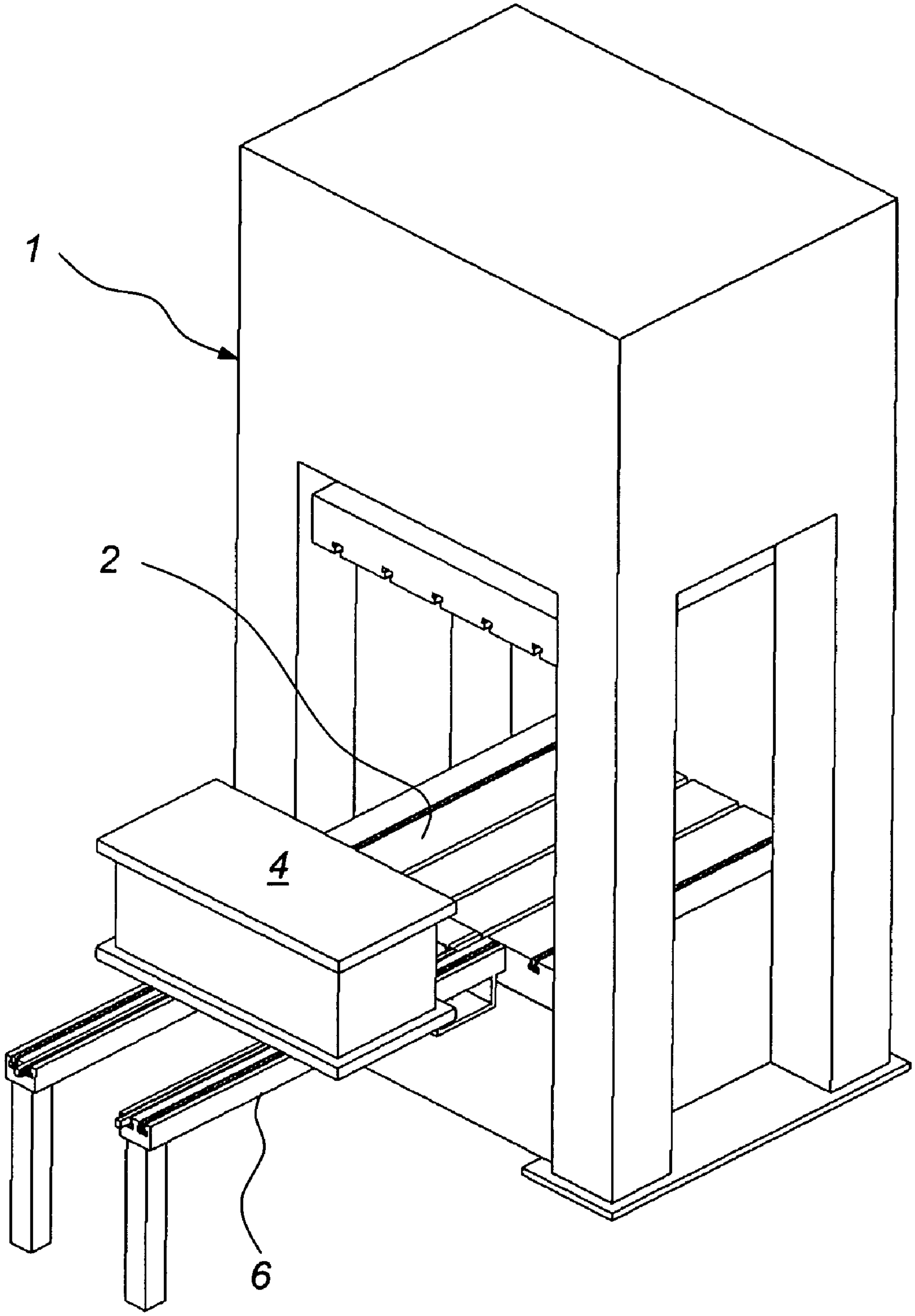
FIG. 2*b* is three-dimensional view and shows the press table in the same occasion as in FIG. 2*a*.

FIGS. 2*a* and 2*b* show the press 1 after the device 8 has moved the object 4 from the press table 2 to the side table 6.

Figure 3A:
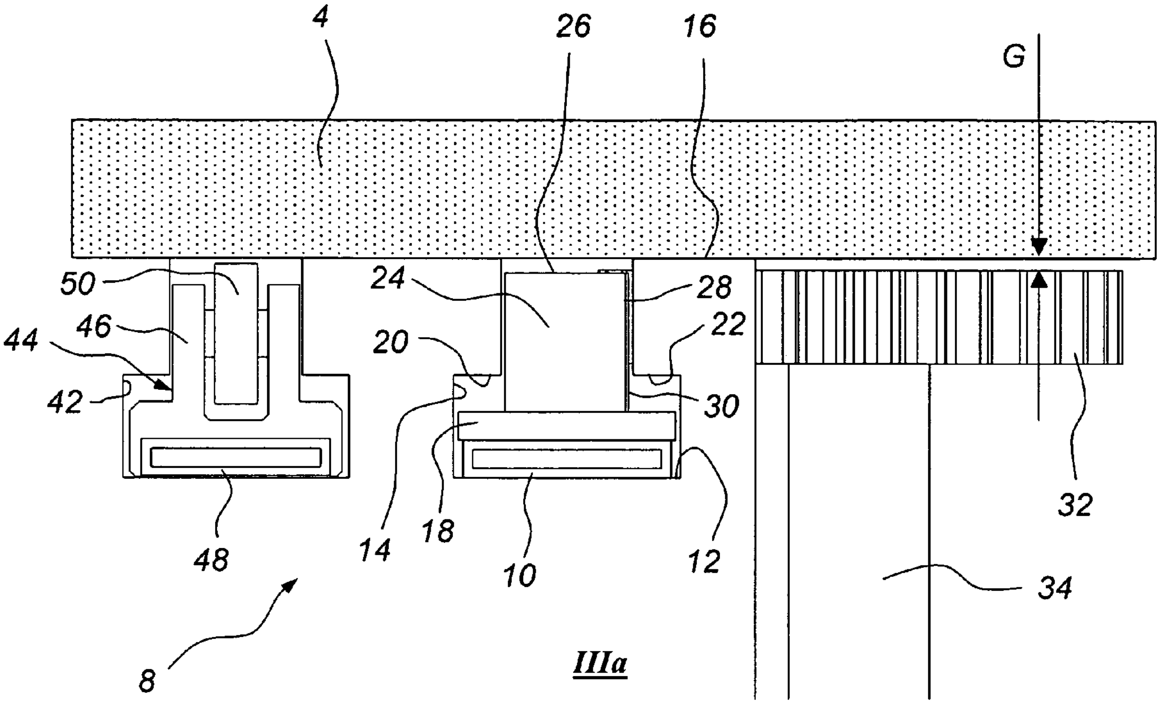
FIG. 3*a* is a side view and shows the device when a bar is in its first position, as seen in the direction of the arrow IIIa of FIG. 1*a*.
Figure 3B:
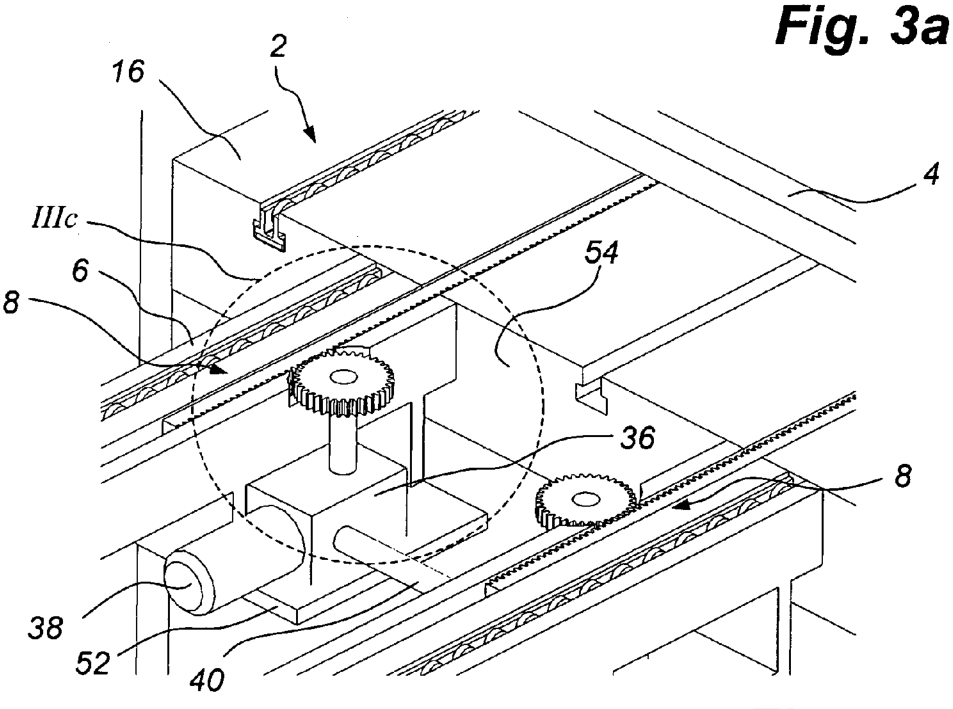
FIG. 3*b* is a three-dimensional view showing a detail of the press table when the bar is in its first position.
Figure 3C:
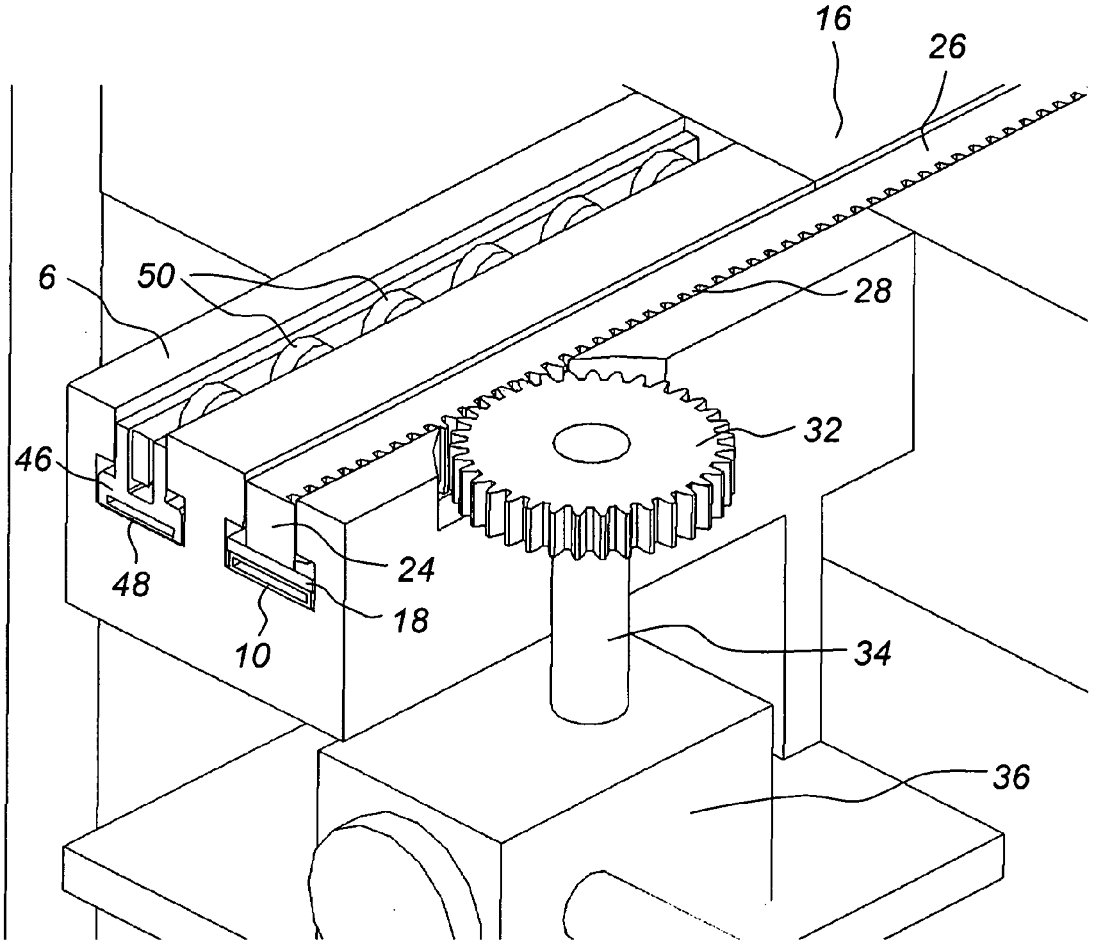
FIG. 3*c* is a further enlargement of the area IIIc shown in FIG. 3*b*.
Figure 4A:
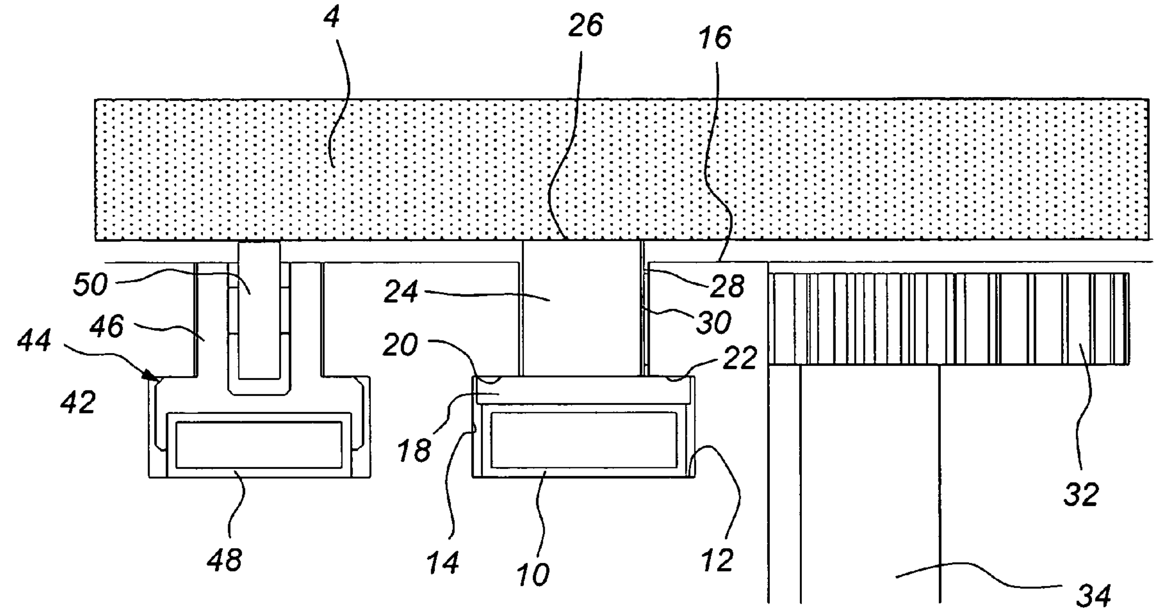
FIG. 4*a* is a side view and shows the device when the bar is in its second position.
Figure 4B:
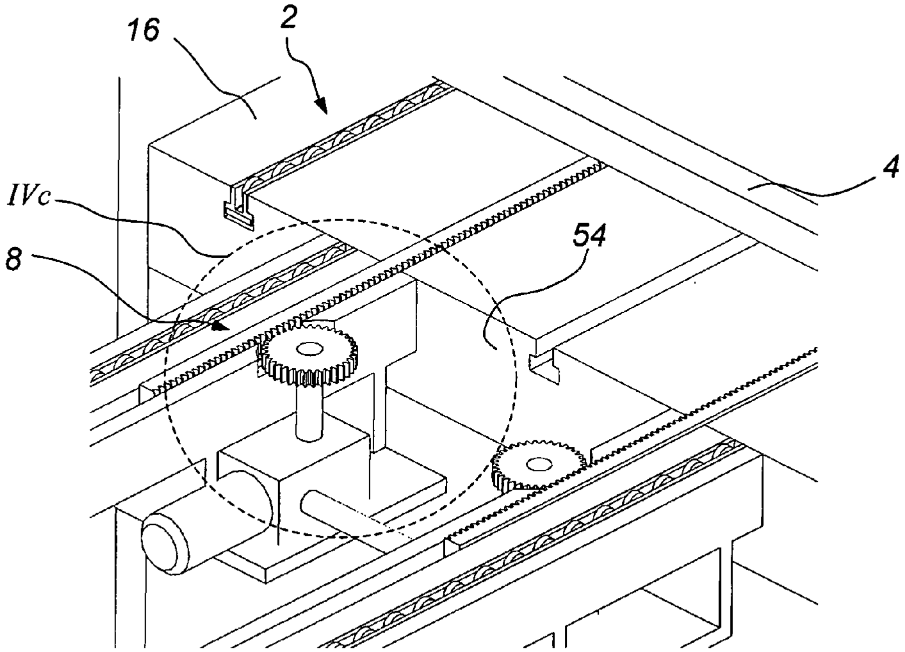
FIG. 4*b* is a three-dimensional view showing a detail of the press table when the bar is in its second position.
Figure 4C:
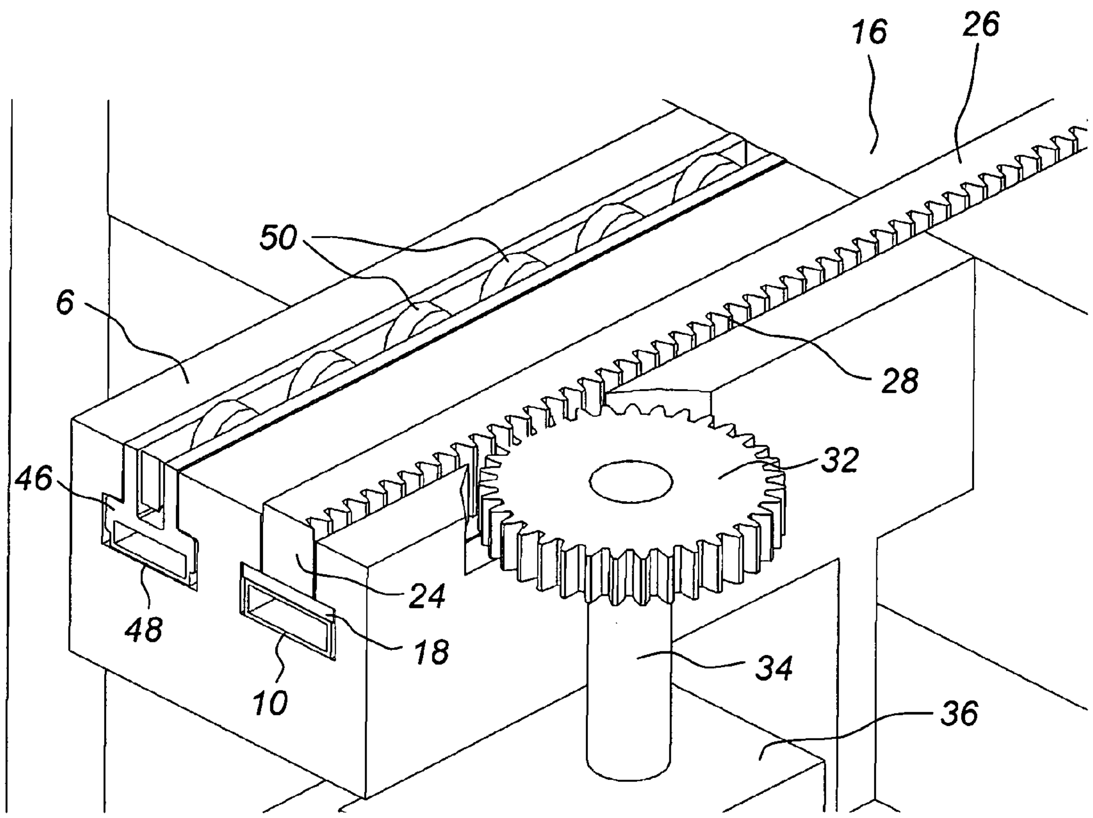
FIG. 4*c* is a further enlargement of the area IVc shown in FIG. 4*b*.

FIG. 3*a–c* show the device 8 in closer detail. The device 8 comprises a bag 10 located at the bottom 12 of an elongated inverted T-slot 14 formed in an upper surface 16 of the press table 2. The inverted T-slot 14 is preferably a standard Joint Industrial Counsel T-slot or a T-slot based on a corresponding European or other industrial standard. As can be seen from FIG. 3*b* the inverted T-slot 14 extends over the table 2 and continues over to the side table 6. The bag 10 is an elongated air bag extending along the length of the T-slot 14. For example the bag 10 could be of a type comprising an inner layer of rubber or plastic and an outer reinforcement. At one end the bag 10 is sealed and at the other end it is fitted to a supply of pressurized air (in FIG. 3*a–c* the bag 10 is schematically shown in a cross section to illustrate its function more clearly). Thus the bag 10 may be inflated according to similar principles as described in U.S. Pat. No. 4,691,554. An elongated strip 18 is located in the slot 14 on top of the bag 10. The strip 18 is preferably made of a low friction material, such as plastic material, such as PTFE (also known as Teflon®). The strip 18 is located below shoulders 20, 22 formed in the T-slot 14. The shoulders 20, 22 limits the movement in the vertical direction of the strip 18. The device further comprises an elongated bar 24, which is located in the slot 14 on top of the strip 18. The bar 24 is vertically movable, by means of inflating the bag 10, for example by means of applying pressurized air to it, from a first position in which an upper surface 26 of the bar 24 is located below the upper surface 16 of the table 2, as shown in FIG. 3*a–c*, to a second position in which the upper surface 26 of the bar 24 is located above the upper surface 16 of the table 2, as shown in FIG. 4*a–c*. In the occasion shown in FIG. 3*a–c* the bar 24 is located in its first position which means that the object 4 rests on the upper surface 16 of the press table 2. The bar 24 is adapted to slide horizontally in its longitudinal direction on top of the strip 18. The strip 18 and the bag 10 extend from the press table 2 to the side table 6 in order to provide a vertically adjustable sliding surface over the whole horizontal distance over which the bar 24 is adapted to move. The bar 24 is provided with gear teeth 28, being straight gear teeth each extending in a direction being normal to the longitudinal direction of the bar 24, on a lateral side 30 of the bar 24. The device 8 further comprises a gear wheel 32 engaging the gear teeth 28 of the bar 24. The gear wheel 32 is adapted to rotate in a horizontal plane and is arranged at a level below the upper surface 16 such that there will always be a gap G between the gear wheel 32 and the object 4. Typically the gap G is 1–10 mm when the bar 24 is in its first position, shown in FIG. 3*a–c*. The gear teeth 28 of the bar 24 and the gear teeth of the gear wheel 32 have such an extension in the vertical direction that they will engage both when the bar 24 is in its first position, as shown in FIG. 3*a–c*, and when the bar 24 is in its second position, as is shown in FIG. 4*a–c*. The gear wheel 32 is fixed to a vertical shaft 34, which is connected to a gear box 36. A motor 38 is connected to the gear box 36 to enable rotation of the gear wheel 32. A horizontal shaft 40 is used to forward power to a gear box of a parallel device 8 for to enable a simultaneous rotation of the gear wheel of that device for to obtain a synchronous horizontal movement of the bars of both the respective devices.

A rail slot 42 is formed in the upper surface 16. The rail slot 42 is an elongated inverted T-slot of the same type as the slot 14 and is parallel therewith. The rail slot 42 houses a rail unit 44 which comprises a rail 46. The rail unit 44 further comprises a rail bag 48 located at the bottom of the rail slot 42, and a number of rollers 50 supported by the rail 46. The rail 46 is vertically movable, by means of inflating the rail bag 48, from a first position, in which the rollers 50 are located below the upper surface 16 of the table 2 as shown in FIG. 3*a–c*, to a second position, in which the rollers 50 extend above the upper surface 16 of the table 2, as shown in FIG. 4*a*–*c*. It will be appreciated that the shoulders of the rail slot 42, being an inverted T-slot, will limit the vertical movement of the rail 46 in a similar manner as described above regarding the strip 18. It will also be appreciated that both the press table 2 and the side table 6 are provided with rail units 44 of the same type.

The gear wheel 32, the shaft 34, the gear box 36 and the motor 38 are fitted in a rack 52 which is fixed to the side table 6 adjacent to a lateral side 54 of the press table 2. This provides a very compact construction since the device 8 does not require any extra space, resulting in that the space requirement around the press table 2 is decided only by the size of the press 1 and of the side table 6. In an alternative embodiment a rack supporting the gear wheel, shaft, gear box and the motor, may be fastened directly on the lateral side 54 of the press table 2.

Thus, in the situation illustrated in FIG. 3*a*–*c* neither the bag 10 nor the rail bag 48 is inflated and thus the object 4 rests on the upper surface 16 of the table 2.

When it is desired to move the object 4 from the press table 2 the following steps are taken: Firstly the bag 10 and the rail bag 48 are inflated to a suitable pressure. Additionally the bags and rail bags of further devices 8 and rail units 44, the presence of which are indicated in FIGS. 3*b* and 4*b*, are also inflated. Due to the inflation of the bag 10 the strip 18 forces the bar 24 upwards, to its second position, such that the upper surface 26 of the bar 24 lifts the object 4 from the upper surface 16 of the table 2. As is clearly shown in FIG. 4*a* the strip 18 abuts the shoulders 20, 22, thus providing a well-defined vertical position for the bar 24. The rail bag 48 lifts the rail 46 such that the rollers 50 will assist in lifting the object 4 from the upper surface 16. The bar 24 and the rollers 50 will thus have the position indicated in FIG. 4*a*14*c*. Once the object 4 has been lifted from the surface 16 the motor 38 is started from a remote control station (not shown). The motor 38 makes the gear wheel 32 rotate and thus forces the bar 24, by means of the gear wheel 32 engaging the gear teeth 28, to slide on the strip 18 in a horizontal direction. Since the object 4 rests on the upper surface 26 of the bar 24 it will be moved horizontally together with the bar 24. Thus the object 4 will be moved horizontally from the location shown in FIG. 1*a*–*b* to the location shown in FIG. 2*a*–*b*. During the movement the object 4 will also slide on the rollers 50 of the rail unit 44, thus decreasing the friction exerted by the bar 24 on the strip 18. When the object 4 has been moved to its desired location, i.e. the location shown in FIG. 2*a*–*b*, the air is allowed to leave the bag 10 and the rail bag 48. Thus the bar 24 will return to its first position indicated in FIG. 3*a*–*c*. Also the rail 46 will return to the position shown in FIG. 3*a*–*c*. Thereby the object 4 is lowered onto the upper surface of the side table 6 from which it may be transported by means of a truck or other transporting systems. The gear wheel 32 is activated again and moves the bar 24, now in its first position shown in FIG. 3*a*–*c*, horizontally back to its original position at the press table 2. The device 8 is then ready for moving another object 4. Of course the device 8 is also used for moving objects from the side table 6 and to the press table 2.

Figure 5:
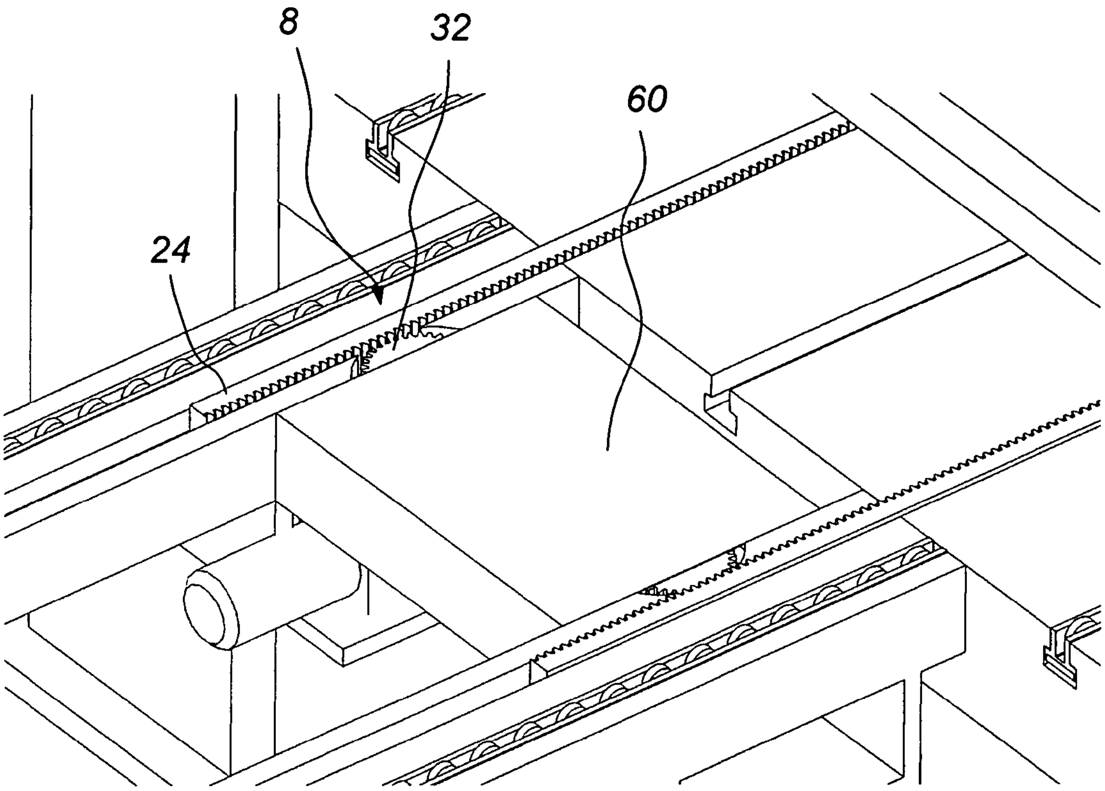
FIG. 5 is a three-dimensional view showing a housing covering a gear wheel and its transmission.

FIG. 5 shows a further embodiment of the invention. In this embodiment a housing 60 is provided over the gear wheels 32 of two adjacent devices 8. The housing 60 protects workers from injuries caused by the gear wheel 32 and protects the gear wheel 32, the shaft 34 and the gear box 36 from damage caused by material from the press 1.

Figure 6:
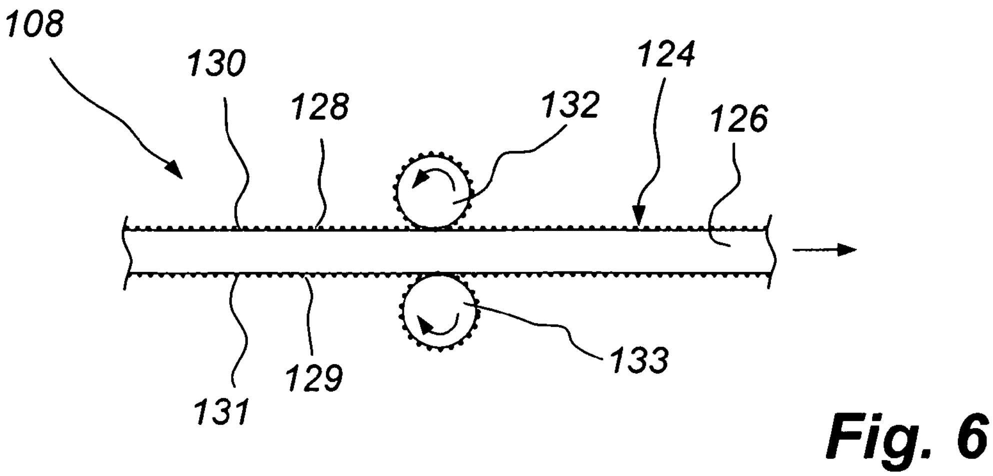
FIG. 6 is a top view and shows a device according to another embodiment of the invention.

FIG. 6 shows a device 108 according to yet another embodiment of the invention. A bar 124, which is seen from above in FIG. 6 is provided with first gear teeth 128 on a first lateral side 130 and second gear teeth 129 on a second lateral side 131, being opposite to said first lateral side 130. A first gear wheel 132 is located adjacent to the first lateral side 130 and engages the first gear teeth 128. A second gear wheel 133 is located adjacent to the second lateral side 131 and engages the second gear teeth 129. The gear wheels 132, 133 are operated simultaneously and cooperate to move the bar 124 in a certain horizontal direction as indicated with arrows in FIG. 6. Due to the two gear wheels 132, 133 cooperating very heavy objects can be transported on an upper surface 126 of the bar 124. The friction against the side walls of the slot, not shown in FIG. 6, is decreased since a lateral force in the direction of the first lateral side 130 generated by the first gear wheel 132 is neutralized by a similar lateral force in the direction of the second lateral side 131 generated by the second gear wheel 133.

Figure 7:
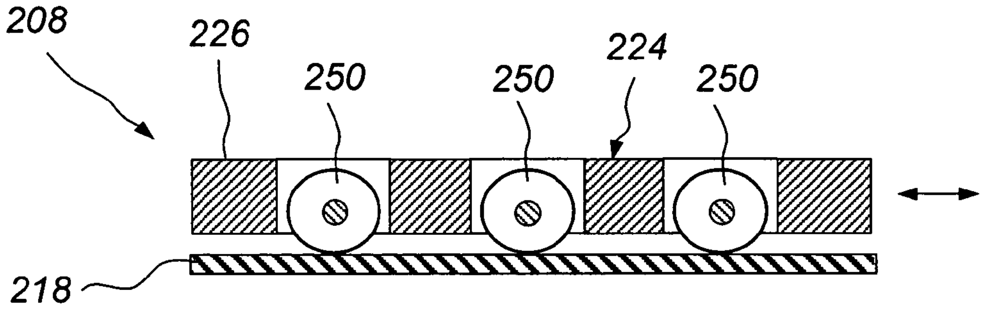
FIG. 7 is a side view in cross section and shows yet another embodiment of the invention.

FIG. 7 shows a still further device 208 according to the invention. A bar 224, which is seen from the side in cross section in FIG. 7, is provided with a number of bar rollers 250. The bar 224 is movable in the horizontal direction by means of a not shown gear wheel engaging gear teeth provided on the bar 224. The bar rollers 250 roll on top of a strip 218 which is located on top of a bag, which is not shown in FIG. 7 but which is similar to the bag 10 shown in FIG. 4*a* etc. Objects may be lifted on top of an upper surface 226 of the bar 224 in a similar manner as described above. The rollers 250 are located below the upper surface 226 and will thus not be in contact with any objects. The advantage of the embodiment of FIG. 7 is that the friction between the bar 224 and the strip 218 is very low, also when very heavy objects are located on the surface 226.

Figure 8:
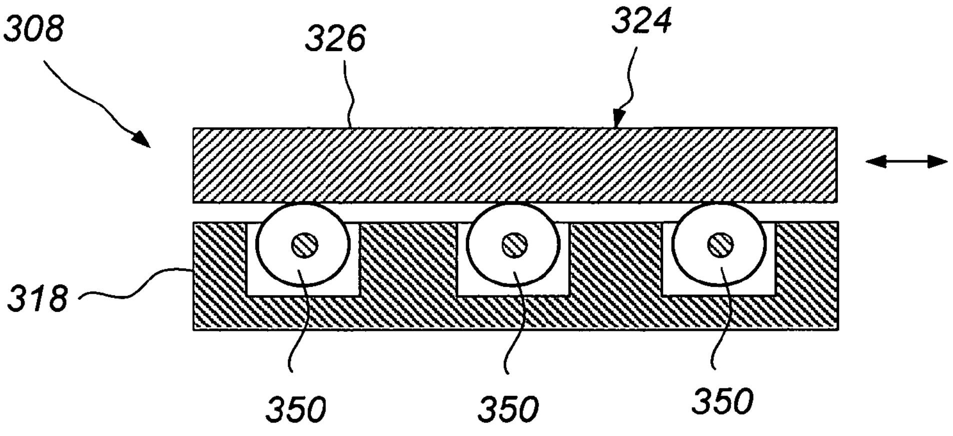
FIG. 8 is a side view in cross section and shows still another embodiment of the invention.

FIG. 8 shows yet another embodiment of the invention in the form of device 308. The device 308 comprises a bar 324, which is seen from the side in cross section in FIG. 8 and which is of the same design as the bar 24 shown in FIG. 4*a* etc. The bar 324, having an upper surface 326 on which objects could be lifted in a similar manner as described above, rolls on top of a strip 318. The strip 318 is located on top of a bag, not shown in FIG. 8. The strip 318 is provided with a number of rollers 350. The rollers 350 decreases the friction between the bar 324 and the strip 318 so that the bar 324 may slide in the horizontal direction with a lower friction, also in the case very heavy objects are located on top of its upper surface 326.

It will be appreciated that numerous modifications of the above illustrated embodiments are possible within the scope of the appended claims.

Above it is illustrated that the device 8 for moving objects 4 includes both a bar 24 and a rail unit 44. It will be appreciated that the rail unit 44, although having advantages, in particular when moving very heavy objects, is not necessary for the invention. Thus it is possible to design a device for moving objects with a bar only.

As described above the bag 10, the strip 18 and the bar 24 are fitted in an inverted T-slot. It will be appreciated that those parts could be fitted into slots of other shapes, such as U-shape etc., formed in a press table.

As an inflating medium for the bag 10 and the rail bag 48 pressurized air is often preferred since it is often available near the press 1. It is, however, also possible to use a pressurized fluid, such as oil or water, or another gas for inflating the bag.

It will be appreciated that the bar 24 and the strip 18 should be made of materials providing a sufficient mechanical strength for lifting objects 4 and a low friction. For instance the bar 24 could be made of a plastic, such as PTFE, or a metal such as steel or brass. Similarly the strip 18 could be made of a metal or a plastic. It is appreciated that the materials of the bar and the strip are chosen such that a low friction is obtained between them.

Above it is described how two devices 8 operate in parallel and with synchronous movement of the respective bars. It will be appreciated that a system for transporting objects from a press table could be provided with 1, 2, 3, 4 and even more devices 8 depending on the weight and size of the objects 4 that are to be transported.

The housing 60 shown in FIG. 5 could be located so as to be flush with upper surface 16 of the press table 2 and could form an integral part of the press table 2.

The invention claimed is:

1. A device for moving objects (4) to and from a table (2) of a press (1), said device (8) comprising a bag (10) located at the bottom (12) of an elongated slot (14) formed in an upper surface (16) of the table (2), a strip (18) located in the slot (14) on top of the bag (10), and an elongated bar (24) which is located in the slot (14) on top of the strip (18), the bar (24) being vertically movable, by means of inflating the bag (10), from a first position in which an upper surface (26) of the bar (24) is located below the upper surface (16) of the table (2) to a second position in which the upper surface (26) of the bar (24) is located above the upper surface (16) of the table (2) so as to lift at least one of the objects (4) located on the table (2), the bar (24) being adapted to slide horizontally in its longitudinal direction on top of the strip (18), characterized in the bar (24) being provided with gear teeth (28), the device (8) further comprising a gear wheel (32) engaging the gear teeth (28) of the bar (24), a motor (38) being adapted to rotate the gear wheel (32) to move the bar (24) in the horizontal direction along the slot (14) when the bar (24) is in its second position and thus to horizontally move the at least one of the objects (4) resting on the upper surface (26) of the bar (24).

2. A device according to claim 1, wherein the strip (18) is located below shoulders (20, 22) formed in the slot (14).

3. A device according to any one of claims 1–2, wherein said slot is an inverted T-slot (14).

4. A device according to claim 1 wherein the gear wheel (32) is covered by a housing (60).

5. A device according to claim 1, wherein the gear wheel (32) and a shaft (34), by which the motor (38) is able to rotate the gear wheel (32), are mounted adjacent to a lateral side (54) of the table (2).

6. A device according to claim 1, wherein the bar (24) is provided with the gear teeth (28) on at least one lateral side (30), the gear wheel (32) being adapted to rotate in a substantially horizontal plane.

7. A device according to claim 1, wherein said bag (10) is inflated by means of pressurized air.

8. A device according to claim 1, further comprising at least one rail unit (44), the at least one rail unit (44) comprising a rail (46) being vertically movable in a rail slot (42) in the upper surface (16) of the table (2), said rail slot (42) being parallel with and adjacent to said slot (14) housing said bar (24), the at least one rail unit (44) further comprising a rail bag (48) located at the bottom of the rail slot (42), and a number of rollers (50) supported by the rail (46), the rail (46) being vertically movable, by means of inflating the rail bag (48), from a first position, in which the rollers (50) are located below the upper surface (16) of the table, to a second position, in which the rollers (50) extend above the upper surface (16) of the table (2) to lift the at least one object located on the table (2), the rail (46) being adapted to be moved to its second position at the same time as the bar (24) is moved to its second position in order to decrease the pressure of the at least one object (4) on said bar (24) and to decrease the friction between said bar (24) and said strip (18).

9. A device according to claim 1, wherein the bar (124) is provided with first gear teeth (128) on a first lateral side (130) and with second gear teeth (129) on a second lateral side (131), a first gear wheel (132) being adapted to engage the first gear teeth (128) and to cooperate with a second gear wheel (133) adapted to engage the second gear teeth (129).

10. A table for a press, said table (2) comprising at least one device (8) according to claim 1, the upper surface (16) of the table (2) having a further elongated slot (42), the two elongated slots (14, 42) having an inverted T-slot shape, the objects being moved to and from the table of the press being die tools and/or molds (4) to thereby move the die tools and/or molds in and out of the press (1).

11. A device according to claim 1, wherein the objects (4) being moved to and from the table (2) of the press (1) are die tools and/or molds, and where the die tools and/or molds are moved from and to, respectively, an intermediate storage place (6).

* * * * *